United States Patent
Anuashvili et al.

(10) Patent No.: US 6,707,488 B1
(45) Date of Patent: Mar. 16, 2004

(54) METHOD OF DETECTING A MOVING TARGET USING BACKGROUND RADIATION

(76) Inventors: Avtandil N. Anuashvili, 117630, Chelomeya 8-1-422, Moscow (RU); Nowshade Kabir, 3050 The Boulevard, Montreal (CA), H3Y 1R7

(*) Notice: Subject to any disclaimer, the term of this patent is extended or adjusted under 35 U.S.C. 154(b) by 0 days.

(21) Appl. No.: 09/564,097

(22) Filed: May 3, 2000

Related U.S. Application Data

(60) Provisional application No. 60/132,374, filed on May 4, 1999.

(51) Int. Cl.[7] .................................. H04N 5/225
(52) U.S. Cl. ................................ 348/169; 348/162
(58) Field of Search .................... 250/332; 342/22, 342/26, 42, 118; 348/162, 164, 169–172; 356/285, 307, 497; 455/271; 382/103, 291; H04N 5/225, 5/335

(56) References Cited

U.S. PATENT DOCUMENTS

| | | | | |
|---|---|---|---|---|
| 5,173,704 A | * | 12/1992 | Buehler et al. | 342/26 |
| 5,175,432 A | * | 12/1992 | Reitman et al. | 250/332 |
| 5,406,501 A | * | 4/1995 | Florent | 348/169 |
| 5,910,839 A | * | 6/1999 | Erskine | 356/28.5 |
| 5,923,365 A | * | 7/1999 | Tamir et al. | 348/171 |
| 6,028,547 A | * | 2/2000 | Dory | 342/22 |
| 6,493,041 B1 | * | 12/2002 | Hanko et al. | 348/170 |
| 6,496,592 B1 | * | 12/2002 | Lanini | 382/103 |

OTHER PUBLICATIONS

Anuashvili A.N. "New Principle of Moving Object Image Reception" CIS Selected papers: Coherent Measuring and Data Processing Methods and Devices. vol. 1978, pp. 147–155. Published by SPIE—The International Society for Optical Engineering, Bellingham, Washington, USA, 1993.

* cited by examiner

*Primary Examiner*—Richard Lee

(57) ABSTRACT

A method and apparatus are provided for detecting a moving target in an observed environment wherein the observed environment includes the moving target and a scattering background. In the method, radiation is transmitted at the observed environment, and radiation is received from the observed environment. Temporal resolution channels are formed from both the transmitted and received radiation. The temporal resolution channels are coherently mixed and then averaged in time to produce an average integral coherent component channel. A non-coherent integral channel is formed from the received radiation. The average integral coherent component channel is normalized using the non-coherent integral channel to produce normalized components. The normalized components are compared and the presence of the moving target is determined based on the result of the comparison. When using this process, the presence of the moving target is thereby being determined at least in part by radiation received from the scattering background.

21 Claims, 3 Drawing Sheets

METHOD OF DETECTING A MOVING TARGET USING BACKGROUND RADIATION

CROSS REFERENCE TO RELATED APPLICATIONS

This application claims the benefit of U.S. Provisional Application No. 60/132,374, filed May 4, 1999, entitled "METHOD OF DETECTING A MOVING TARGET AND RECOGNIZING ITS THREE-DIMENSIONAL FORM."

BACKGROUND OF THE INVENTION

According to traditional ideas, the problem of detecting a moving object lies in the fact that the sensing radiation is reflected by the object to a lesser degree than from the background. The "interfering background" masks the useful signal from the object. This problem also arises if there is no contrast between the object and the background. In addition to this passive noise, target detection is also hindered by purposeful active impact noise "blinding" the locator.

A new approach to detecting low-observable moving targets is described in the following paper, which is incorporated herein by reference:

Anuashvili A. N. "New Principle of Moving Object Image Reception." CIS

Selected papers: Coherent Measuring and Data Processing Methods and Devices.

Volume 1978, pp.147–155. Published by SPIE—The International Society for

Optical Engineering, Bellingham, Wash. USA, 1993.

In this approach, the traditional noise (i.e., the coherent component of the radiation reflected from a stationary background) is regarded as the source of information about the detected object, and the traditional useful signal (i.e., radiation reflected from the target) is disregarded by being set to zero when processing the recorded radiation. As described herein, "background" is the environment behind the moving object that can reflect radiation. According to the background principle, the signals from a moving object are extracted from the radiation of the background against which the object moves. (In practical applications, the background can be represented by the underlying surface, namely, terrain, ionosphere, sea bottom, etc.). The background principle of detection is based on coherent reception of the sensing radiation scattered by the background and isolation of its coherent component. When a moving object appears, the coherent component decreases, thus signaling the fact of detection. The background principle modifies and complements the traditional ideas about signal and noise. In a conventional detection scheme, the belief is that a signal can be obtained by directly studying the object and that the radiation from the background is noise which should be suppressed. By the background principle, the background radiation is functionally related to the signal, and therefore, one can judge the signal from the functional dependence of the background (noise) on the signal. This is especially important if the radiation scattered by the background (traditional noise) is much greater than the traditional useful signal.

This principle has the potential for developing new systems for detecting and recognizing moving targets independent of its scattering ability and active noise (target may be scattering, absorbing or transparent and background must be scattering). The above-noted paper describes the principle of low-observable moving object image reception and demonstrates some possibilities of its application. The formal description of the theory in the paper is provided in the Appendix below. However, this paper does not propose a technological solution that is necessary for practical realization of the principle.

The present invention provides such a technological solution.

SUMMARY OF THE INVENTION

One object of the present invention is to overcome many of the disadvantages of the prior art systems. Some advantages of the present invention are as follows:

1. Development of a special technological solution (method and system) for moving target detecting and recognizing with high probability, independent of the scattering ability and active noise of the target.

2. Providing a process for recognizing the three-dimensional form of a moving object independent of its scattering ability (e.g., a transparent object).

3. Providing a quickness of moving target detection process by using additional temporal resolution integral coherent and noncoherent channels.

Briefly stated, the present invention is a method for detecting a moving target in an observed environment, the observed environment including the moving target and a scattering background. The method includes the steps of transmitting radiation at the observed environment, receiving radiation from the observed environment, forming temporal resolution channels from both the transmitted and received radiation, coherently mixing the temporal resolution channels and averaging them in time to produce an average integral coherent component channel, forming a non-coherent integral channel from the received radiation, normalizing the average integral coherent component channel using the non-coherent integral channel to produce normalized components, comparing the normalized components among themselves, and determining the presence of the moving target based on the result of the comparison. The presence of the moving target is thereby being determined at least in part by the radiation received from the scattering background.

In another aspect, the present invention is system for detecting a moving target in an observed environment. The observed environment includes the moving target and a scattering background. The system includes a transmitter which directs radiation at the observed environment, at least one receiver which detects back scattered radiation from the observed environment, a mixer which generates an average integral coherent component channel by coherently mixing temporal resolution channels formed from both the transmitted and received radiation and averaging the temporal resolutions channels in time, and an analyzer which normalizes the average integral coherent component channel using a non-coherent integral channel formed from the received radiation and compares the normalized components among themselves. The analyzer determines the presence of the moving target based on the result of the comparison. The presence of the moving target is thereby being determined at least in part by the radiation received from the scattering background.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Figure 1:
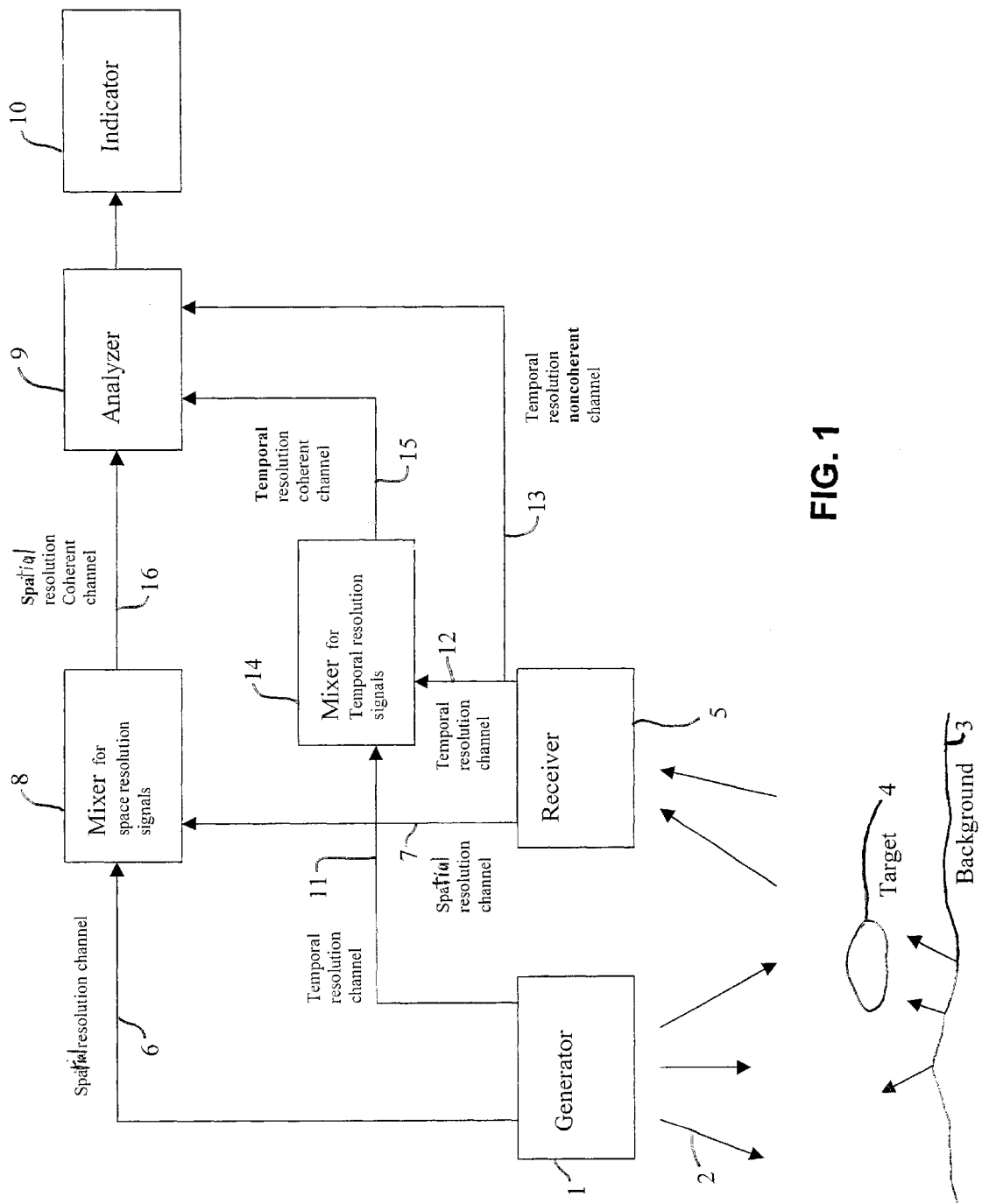
FIG. 1 is a schematic block diagram of a general scheme for implementing the present invention.

In the drawings, like numerals are used to indicate like elements throughout.

I. Description of the Method

The present invention builds upon the principles set forth in the above-noted paper. Certain parts of the present invention are similar to the principles in the paper and other parts are different. The similarities are as follows:

1. Generated radiation is directed on an observed environment consisting of scattering background and a moving target. The target may have a scattering ability of any level, thus providing stillness of the generator relative to the background or compensation of movement of the generator relative to the background.

2. Back scattered radiation from the observed environment is registered by a receiver.

3. Spatial resolution channels are formed from both the receiver and the generator. The signals are mixed coherently among themselves and are averaged in time. The obtained coherent spatial signal is analyzed and judged to determine the presence and form of the moving object in the field of view.

The differences are as follows:

1. An additional noncoherent integral channel is formed from the receiver.

2. Temporal resolution channels are formed from both the generator and the receiver. The signals from these channels are mixed coherently and are averaged in time. The averaging time is chosen by equal averaging time in spatial resolution channels, mentioned in the similarities above.

3. Average integral coherent components are formed, normalized with the help of signals from the additional noncoherent integral channel, and consistently compared among themselves. Based on the result of comparison, a judgment is made about the presence of a moving target in the field of view. If it is determined that a moving target exists, recognition of the three-dimensional form of the detected target is performed in the spatial resolution channel, wherein spatial coherent signals are normalized with the help of the signal from the additional noncoherent integral channel. The spatial coherent signal obtained before moving target detection is compared with the same signal obtained after its detection. Thus, the analysis focuses on different depths of spatial coherent signals (three-dimensional signals) and a comparison is made according to correlating sections of three-dimensional signals obtained before and after moving target detection. The combined analysis by the multiple sections is judged to determine the three-dimensional coordinates of the moving target surface. High accuracy is achieved by maximizing the D/X ratio, wherein X>L, where D=dimension of target in movement direction,
X=target displacement value in averaging time, and
L=generator wavelength.

II. Description of the System

FIG. 1 shows a schematic block diagram of a system for implementing the method discussed above. Referring to FIG. 1, radiation 2 of generator 1 is directed on an observed environment consisting of scattering background 3 and a moving target 4. The scattering ability of the moving target 4 can have any level, thus providing stillness of the generator relative to the background or compensation of movement of the generator relative to the background. Radiation from the observed environment is registered by receiver 5, which may be a single receiver, or multiple receivers, such as, an array of receivers.

This radiation is preferably back scattered radiation, but may also include radiation generated by the scattering background 3 itself. Spatial resolution channels 6 and 7 are formed from the outputs of the generator 1 and the receiver 7, respectively. The channel signals are mixed coherently among themselves in mixer 8 and are averaged in time to obtain a coherent spatial signal 16. The coherent spatial signal 16 is analyzed by the analyzer 9 which outputs information regarding the presence (coordinates) of a moving object in the field of view and its form. The information is communicated to a user on indicator 10.

The analyzer 9 also receives two temporal inputs. An additional noncoherent integral channel 13 is formed from the output of the receiver 5 and forms one of the temporal inputs. The outputs of the generator 1 and the receiver 5 form temporal resolution channels 11 and 12. The signals on these channels are mixed coherently in mixer 14 and are averaged in time to obtain an average integral coherent component channel 15 in which signals are formed multiple times. In the analyzer 9, the time average integral coherent components from temporal resolution coherent channel 15 are normalized with the help of the signal from the additional noncoherent integral channel 13 and normalized components are consistently compared among themselves.

Based on the result of comparison, a judgment is made about the presence of a moving target in the field of view. Then, recognition of the three-dimensional form of the detected target is performed analyzer 9 wherein the spatial coherent signals are normalized with the help of the signal from the spatial resolution channel 16 and from the additional noncoherent integral channel 13. The spatial coherent signal obtained before moving target detection is compared with the same signal obtained after its detection. Thus, the analysis focuses on different depths of spatial coherent signals (three-dimensional signals) and a comparison is made according to correlating sections of three-dimensional signals obtained before and after moving target detection. The combined analysis by the multiple sections is judged to determine the three-dimensional coordinates of the moving target surface. Combined analysis may be done with the help of mathematical interpolation.

Signal processing in the spatial resolution channel 16, including the focusing of the analyzer 9 on different depths, may be realized electrically by processing of digital electrical images or may be realized optically by processing of optical images.

In an alternative embodiment of the present invention, the generator 1 transmits radiation in the broadcast television band. The transmitted radiation may take the form of a broadcast television signal. The user of such radiation is advantageous in that it may easily be accepted coherently, as the parameters of this radiation are known and it contains synchronizing pulses. Moreover, the wavelength of this radiation is longer than is traditionally used in a radar-location system. An increase in the wavelength of the generator 1 increases the ability to detect a moving target.

Figure 2A:
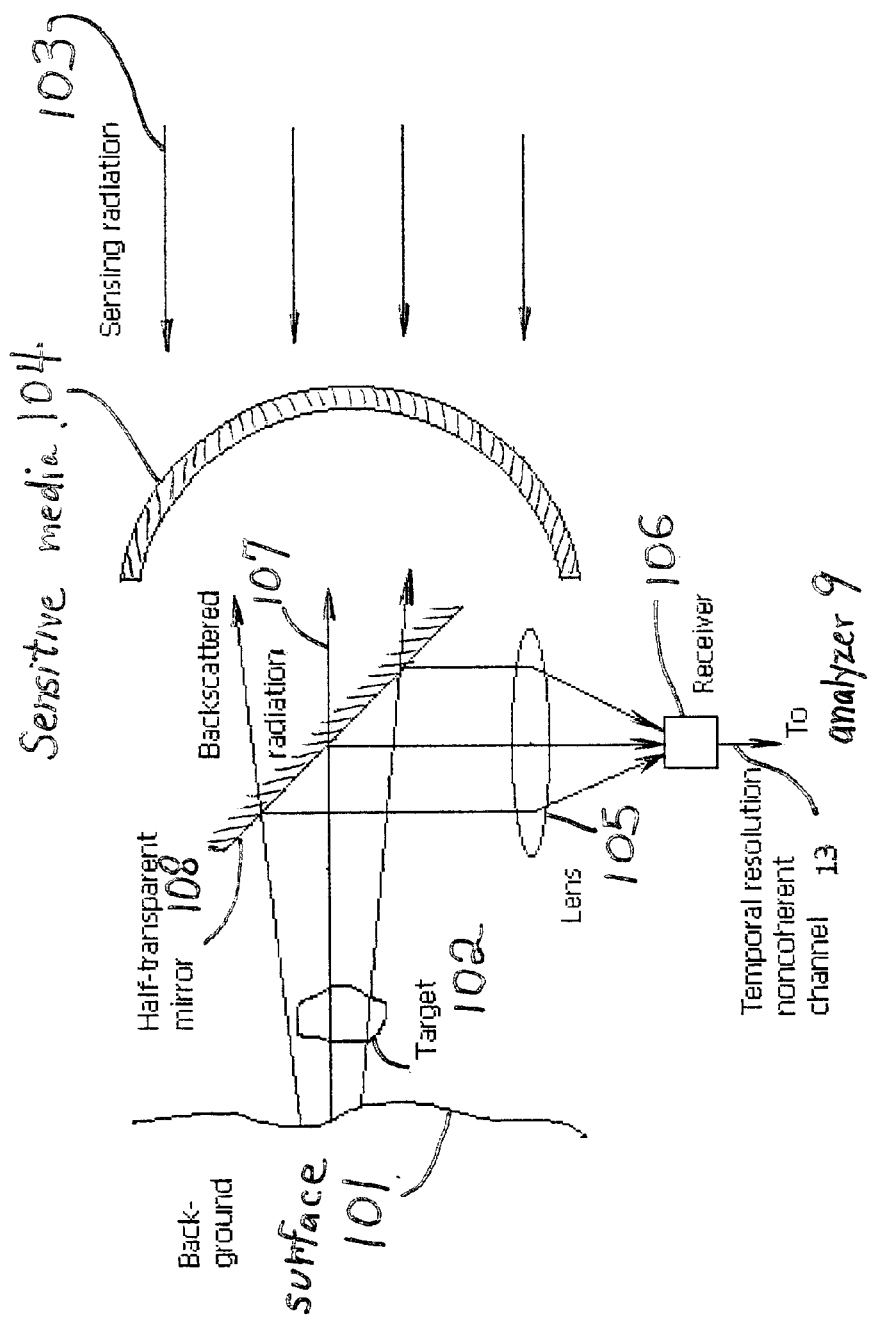
FIGS. 2a and 2b, taken together, show an optical embodiment of the present invention.
Figure 2B:
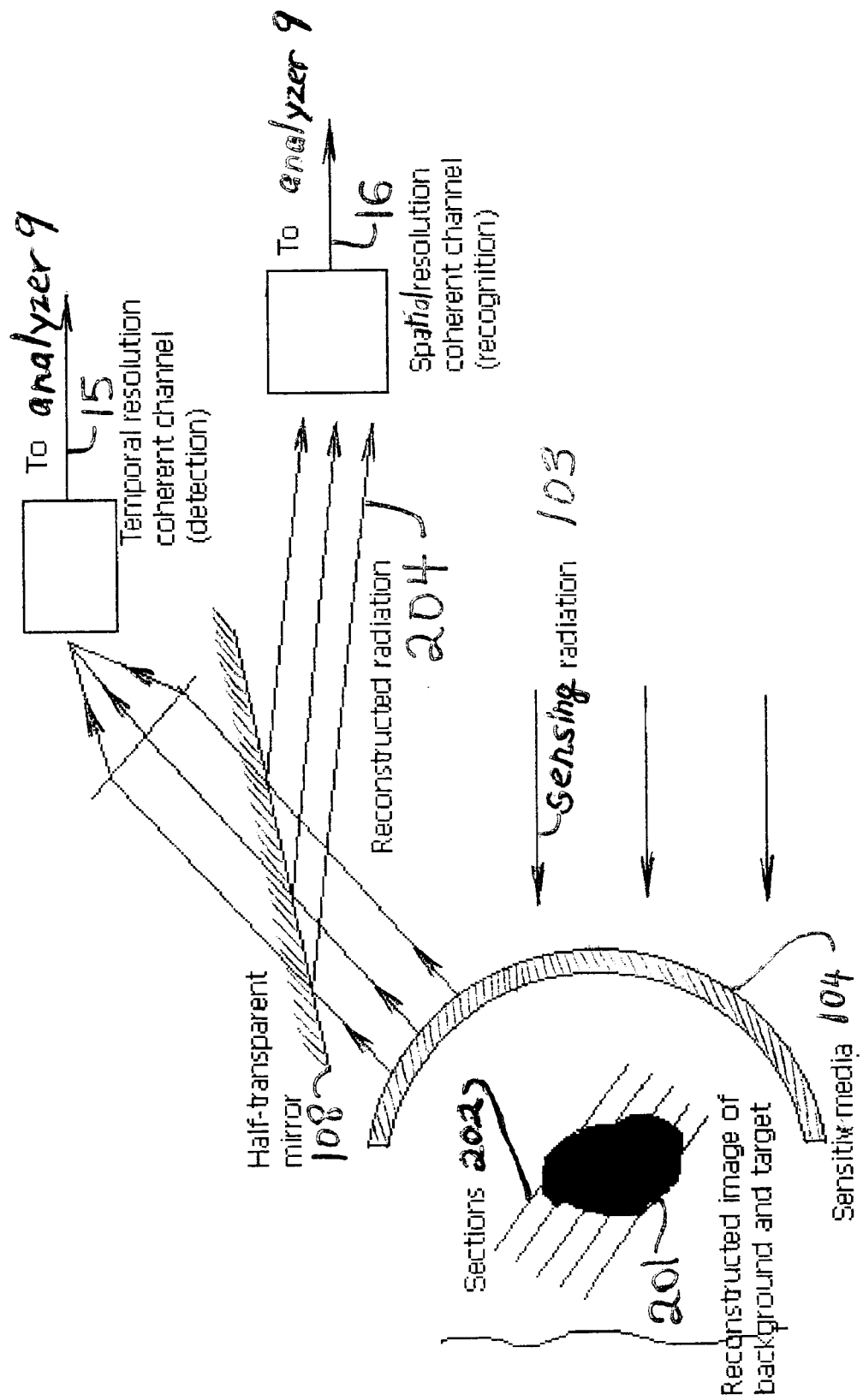

FIGS. 2a and 2b, taken together, show an optical embodiment of spatial and temporal resolution channel realization. FIG. 2a shows the process of optical signal registration and FIG. 2b shows the process of optical signal reconstruction and formation of spatial and temporal coherent resolution channels.

Referring to FIG. 2a, a background surface 101 and a target 102 is shown. Back scattered radiation 107 received from the background surface 101 and target 102 areas is divided by half-transparent mirror 108 and registered in sensitive media 104 with the help of sensing radiation 103. Divided radiation is summed using lens 105 and is integrally registered by receiver 106. This process forms the temporal resolution noncoherent channel 13. Temporal resolution occurs in the analyzer 9 of FIG. 1.

Referring to FIG. 2b, radiation of sensing radiation (generator) 103 propagates through the sensitive media 104 which coherently registers the image (interference structure) of the observed environment. On a reconstructed three-dimensional image (imaginary image) 201, the background appears as a light area and the moving object disappears. Instead of the moving object, a three-dimensional dark area appears which correlates to the three-dimensional form of the target. The reflection from the sensitive media true image (reconstructed radiation) 204 is used to form the spatial resolution coherent channel 16. In this channel, the analyzer 9 is focused on different depths. Obtained sections 202 allows the analyzer 9 to reconstruct three-dimensional coordinates of the moving target surface. Half-transparent mirror 108 is used to form the temporal resolution coherent channel 15, which is used for detection of the moving target.

If a particular application requires only the detection of the presence of a moving object, and not the recognition of its three-dimensional form, the process described above may be simplified by using only the temporal resolution channels.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

Formal Description of Theory in Anuashvili Paper

We present a formal writing of the processes of coherent reception and detection of a signal against the background of noise using the background principle.

Coherent reception by active system.

We write the instantaneous value of the complex amplitude of received signal as $$a_f \exp[i(\phi_0+\omega_0 t+\Delta\phi)],$$

where $a_f$ is the amplitude of received field, $\phi_0$ is the initial phase of the generator of sensing system, $\omega_0$ is the generator frequency, t is time, $\Delta\phi$ is the phase shift of generator radiation upon passing the distance to the environment (background) under consideration and back.

The complex amplitude of natural oscillations in the system is represented as $$a_0 \exp[-i(\phi_0+\omega_0 t)],$$

where $a_0$ is the amplitude of natural oscillations of the receiver. The result of coherent reception can be written as $$a_f \exp[i(\phi_0+\omega_0 t+\Delta\phi)] \times a_0 \exp[-i(\phi_0+\omega_0 t)] = a_f a_0 \exp(i\Delta\phi) = I. \quad (1)$$

which is the intensity of radiation resulting from coherent reception and depending on the phase difference between the oscillations of generator and returning signal. This value is called the coherent component. Its value is constant if there is no moving object.

The phase difference $$\Delta\phi = \frac{2\pi}{\lambda} c t_z$$

where $t_z$ is the sensing time, that is, the time during which the radiation covers the distance to the background and back, c is the speed of propagation of generator radiation, and $\lambda$ is the generator wavelength, is independent of the current time.

When an object appears, $\Delta^\Phi$ starts to vary in time and becomes a random variable. The point is that, no matter what object—reflecting, absorbing, or transparent—appears against the background, it causes random variations in the sensing time $t_z$ due to the changes in the path of radiation propagation and (or) speed of radiation propagation due to the Fresnel-Fizeau effect, which in its turn causes random variations of the phase difference $\Delta\phi$. Therefore, the obtained intensity $I=a_f a_0 \exp(i\Delta\phi)$ also becomes a random variable.

The time-averaged value of this intensity will be smaller than that before the appearance of the moving object, because the mean value of a random variable is known to tend to zero. The signal can be detected by simply subtracting two subsequent time-averaged values of the intensity (coherent component).

The squared absolute value of intensity during the time T $$\bar{I} = \left| \frac{1}{T} \int_{t_0}^{t_0+T} I \, dt \right|^2$$

is taken, and the difference between two subsequent values of the averaged intensity $$\Delta I = \bar{I}(t_0, T) - \bar{I}(t_0+T, T)$$

is found.

If no object appears during this interval, then the difference will be zero. If a moving object appears during the current interval of averaging T, then the mean value of intensity will be smaller than that on the preceding interval, producing the difference $\Delta I>0$. This happens because the moving object violates coherence, thus leading to appearance of a variable signal and decrease of the coherent component.

Formal writing of signal detection in noise by the background principle.

In the classic representation, the problem of signal detection in noise is representable as $$S_1=0+\xi(t),$$

$$S_2=\epsilon(t)+\xi(t),$$

where $\epsilon(t)$ is the signal, and $\xi(t)$ is noise.

The aim of detection is to discriminate between the cases $S_1$ and $S_2$.

The proposed model is based on introducing a spatial dependence of the signal on the parameter $\rho_{R_s}$ which is the equation of the surface in the domain of space where the variable signal is generated, that is, where the object moves.

The equation of the surface of the observed domain of space, that is, of the background over which the object moves, is denoted the parameter $$\rho_{R_f}$$

$$\rho_{R_s} \in \rho_{R_f}$$

Noise is represented as a sum of two components:
ti $S_1 = 0 + \xi_1(t) + \xi_2(R_f)$ $$S_2 = \varepsilon \left[ \rho_{R_s}(t) \right] + \xi_1(t) + \xi_2 \left\{ \left[ \rho_{R_s(t)} \right], \left[ \rho_{R_f} \right] \right\},$$

where $\xi_1(t)$ is noise dependent on time and independent of space, and $$\xi_2(\rho_{R_f})$$

is noise dependent on space and independent of time. We notice that with the appearance of a signal the coherent component of noise $\xi_2$ becomes functionally dependent on the signal.

Now, the absolute value of averaged summarized signal is squared and the difference of both cases is found:

$$\Delta S = |\overline{S_1}|^2 - |\overline{S_2}|^2 > 0.$$

If there is no variable signal, then the time-dependent noise is zeroed, and only a constant, that is, coherent component is left.

If a variable signal appears, then the variable component of noise will be zeroed as a result of time-averaging, and the coherent component, which depends functionally on the variable signal, becomes itself a random variable and decreases as a result of time-averaging.

The signal can be detected by simple subtraction of two subsequent averaged values of the coherent component. If there is no variable signal, then $\Delta S = 0$. If a signal appears, then $\Delta S > 0$.

If $S_2$ is not an alternating-sign value, then the following formula can be conveniently used to detect the signal:

$$\Delta S = |\overline{S_2}|^2 - |\overline{S_2}|^2 > 0.$$

Efficiency of the Technology

The efficiency of the background method of detecting variable signals is expressed as $$\sigma = \frac{\xi_2}{\varepsilon} > 1,$$

that is, this method is efficient if noise is greater than the signal.

This method is efficient if traditional noise is greater than the traditional (Doppler) signal. Importantly, if using the background principle, the target reflecting power (ESS) does not affect the efficiency of target detection, because detection is based on coherent reception of the background radiation, and the radiation reflected from the target is zeroed because of time-averaging. Of special importance is the fact that, as was proved experimentally in Russia, the presence of purposeful active target noise does not affect the efficiency of target detection because the active noise is involved in the noncoherent noise component and under time-averaging tends to zero. In practical radiolocation, the efficiency of this method for detecting a hang-glider at a distance of 15 km proved to be of the order of five, because the energy of radiation from the background recorded in the object's spatial angle turned out to be five orders greater than the effective scattering surface (ESS) of the hang-glider. Then, the signal/noise ratio (the ratio of the energy of coherent component of background (noise) to the energy of receiver noise) was $10^2$, whereas in the traditional (Doppler) channel of detecting the signal/noise ratio (the ratio of the target ESS to the energy of receiver noise) was $10^{-3}$. Efficiency of the new approach can be accounted for by the following factors.

1. The existing methods of detecting low-contrast weakly-scattering objects are based on coordinating the parameters of observer (sensing radiation) and moving target. This is difficult to implement because the moving (especially arbitrary) target changes the parameters of the sensing radiation in a random manner. Various approaches such as correlation of the wavelength and object size, correlation of the pulse wavefront and object form, etc., are proposed to detect the "Stealth" aircraft. Yet, coherent reception of the radiation scattered by a moving target is problematical. The proposed approach is based on the ability of target to disturb correlation (coherence) of the parameters of observer and background, because it is much easier to realize coherent reception of the radiation scattered by a relatively stable background than the radiation scattered by a moving target. The appearance of a moving target against the background all but erases the coherent component of the background radiation in the spatial angle. It is much simpler to detect this fact than perform complicated correlation processes.

2. Whereas the existing methods are based on differential (spectral, for instance) analysis, the proposed method is based on integral perception of the radiation. The coherent sum of radiation in space and time turns out to be much more sensitive to the appearance of a variable signal than the differential components of radiation scattered by the target.

3. It might be well to point out that as far back as in the 1968–1972 time period in the United States (Leit, Cock) and Russia (Denisyuk) the researchers of holography and radiotocation, attempted to design a highly efficient radiolocator based on the principles of holography. Relying on the traditional radiolocational concepts of signal and noise, they concentrated their efforts on obtaining a holographic image of a moving target and on suppressing noise. This proved to be an engineering challenge, because it is required here to record coherently the radiation scattered by the moving target. Several methods were proposed to compensate the changes in radiation caused by the moving target, but their implementation in case of arbitrary motions is very difficult. If the observer moves, then it is much easier to record coherently the background radiation or image-synthesis of aperture. Then, the appearance of a moving object over the background disturbs coherence of reception from the areas where the object moves, thus resulting in a dramatic decrease of the coherent component of background radiation, which results in the appearance of a contrast area in the background which has the form of target. A high-resolution observer also allows one to obtain information about target's speed and form. The scattering power of target and active noise do not affect appreciably the process of detection and recognition.

4. Comparison with Doppler effect. The work presents a simplified explicit formula of intensity of the time-averaged complex amplitude $I_a$ as recorded using the proposed method vs. the parameters of target and background radiation:

$$I_a = I_b \left(1 - \frac{d}{VT\sin a}\right)^2, \quad (1)$$

$VT$ Sin $a > d$, $a \neq 0$ where $I_b$ is the intensity of radiation in the background domain under consideration, d is the dimension of object along the direction of motion, V is the speed of object, T is the interval of averaging radiation, a is the angle between the directions of observation and motion of object, and VT sin a is the projection of object motion in the direction perpendicular to the direction of observation.

For comparison, we present a simplified formula of the Dopller's effect:

$$\Delta v = \frac{2V \cos a}{\lambda} \quad (2)$$

Both (1) and (2) describe the radiation parameter vs. object's speed and direction. Let us compare them:

the radiation parameters in (1) and (2) are, respectively, intensity and difference of frequencies, the value of determined parameter depends in (1) on the intensity of radiation reflected by the background and in (2) on the radiation reflected from the target, (1) and (2) depend on speed, respectively, in inverse and direct proportion to speed, (1) depends on the tangential speed component ( sin a), and (2) depends on the radial one (cos a).

(1) is independent of the wavelength, and (2) depends on it in inverse proportion, and (1) involves the time of radiation averaging T which can be controlled by the operator to enhance the detection efficiency, and (2) has no such parameter. It must be noted that the dependence of (1) is observed under definite relations between the parameters of the observer wavelength ($\lambda$) and time of avenging (T) and object dimension (d) and speed (V), namely, $\lambda <$ VT Sin a<d, which enables one to discriminate, targets not only in speeds as in (2), but also in dimensions.

5. All existed countermeasures (active and passive noise) were invented for the traditional method for detection of moving targets; no countermeasure yet exists for the proposed method.

Therefore, the background principle gave rise to a new, nonlocational method of detection of a moving object which proves efficient where the traditional methods (including the Doppler effect-based ones) do not work (for example, if the target does not backscatter the sensing radiation and moves perpendicularly to the directivity diagram and, at the same time, impact noise is directed to the receiving antenna). This advantage of the method was validated experimentally in real time and in a realistic environment using a physical radiolocator. The proposed new method of detection, which is based on the discovery made at the Institute of Control Sciences, Russian Academy of Sciences, is also efficient if there is not any contrast between the moving object and background. The background principle sets one reevaluating the domain of detection of moving objects and changes the sense of notions such as "interfering background," "background-target situation," "signal-noise," etc., and complements the Doppler effect because it is as if its reverse or complement. Both methods must be used hand in hand. The background principle was realized in detection of moving objects, security devices, biology, and psychology; it can find application also in socioeconomic environment, ecology, and for accident forecasting.

Generally speaking, the shorter is wave length of radar, the more complicated is implementation of coherent reception. It's better to use longer waves or take the advantages of SAR technique (possibility of movement compensation).

We claim:

1. A method for detecting a moving target in an observed environment, the observed environment including the moving target and a scattering background, the method comprising determining the presence of the moving target in the observed environment by:

(a) transmitting radiation at the observed environment;

(b) receiving radiation from the observed environment;

(c) forming temporal resolution channel signals from both the transmitted and received radiation;

(d) coherently mixing the temporal resolution channel signals and averaging them in time to produce an average integral coherent component channel signal;

(e) forming a non-coherent integral channel signal from the received radiation;

(f) normalizing the average integral coherent component channel signal using the non-coherent integral channel signal to produce normalized components;

(g) comparing the normalized components among themselves; and (h) determining the presence of the moving target based on the result of the comparison, the presence of the moving target is thereby being determined at least in part by radiation received from the scattering background.

2. The method of claim 1 further comprising recognizing the three-dimensional form of the moving target in the observed environment by:

(i) forming spatial resolution channel signals from both the transmitted and received radiation;

(j) coherently mixing the spatial resolution channel signals and averaging them in time to obtain a coherent spatial signal;

(k) normalizing the coherent spatial signal using the non-coherent integral channel signal; and (l) determining the three-dimensional form of the moving target by comparing the coherent spatial signal obtained before determining the presence of the moving target with the coherent spatial signal obtained after determining the presence of the moving target.

3. The method of claim 2 wherein the averaging time for the temporal resolution channel signals is equal to the averaging time for the spatial resolution channel signals.

4. The method of claim 2 wherein the comparison in step (l) focuses on different depths of spatial coherent signals.

5. The method of claim 2 wherein the comparison in step (l) is made by correlating sections of the coherent spatial signal obtained before and after determining the presence of the moving target.

6. The method of claim 2 wherein the comparison in step (l) is made using mathematical interpolation.

7. The method of claim 1 wherein D is the dimension of the moving target in the direction of movement, X is the target displacement value in averaging time, and L is the wavelength of the transmitted radiation, the method further comprising:

(i) maximizing the ratio of D/X, wherein X>L.

8. The method of claim 1 wherein the wavelength of the transmitted radiation is in a broadcast television band.

9. The method of claim 1 wherein the transmitted radiation is a broadcast television signal.

10. The method of claim 1 wherein the received radiation is back scattered radiation.

11. A system for detecting a moving target in an observed environment, the observed environment including the moving target and a scattering background, the system comprising:

(a) a transmitter which directs radiation at the observed environment;

(b) at least one receiver which detects radiation from the observed environment;

(c) a first mixer which generates an average integral coherent component channel signal by coherently mixing temporal resolution channel signals formed from both the transmitted and received radiation and averaging the temporal resolutions channel signals in time; and (d) an analyzer which normalizes the average integral coherent component channel signal using a non-coherent integral channel signal formed from the received radiation and compares normalized components among themselves, the analyzer determining the presence of the moving target based on the result of the comparison, the presence of the moving target is thereby being determined at least in part by radiation received from the scattering background.

12. The system of claim 11 further comprising:

(e) a second mixer which generates a coherent spatial signal by coherently mixing spatial resolution channel signals formed from both the transmitted and received radiation and averaging the spatial resolution channel signals in time;

wherein the analyzer, after determining the presence of the moving target, normalizes the coherent spatial signal using the non-coherent integral channel signal and determines the three-dimensional form of the moving target by comparing the coherent spatial signal obtained before determining the presence of the moving target with the coherent spatial signal obtained after determining the presence of the moving target.

13. The system of claim 12 wherein the averaging time for the first mixer is equal to the averaging time for the second mixer.

14. The system of claim 12 wherein the analyzer focuses on different depths of spatial coherent signals in making the comparison.

15. The system of claim 12 wherein the analyzer correlates sections of the coherent spatial signal obtained before and after determining the presence of the moving target in making the comparison.

16. The system of claim 12 wherein the analyzer uses mathematical interpolation in making the comparison.

17. The system of claim 11 wherein D is the dimension of the moving target in the direction of movement, X is the target displacement value in averaging time, and L is the wavelength of the transmitted radiation, further comprising means for maximizing the ratio of D/X, wherein X>L.

18. The system of claim 11 wherein the transmitter directs radiation in a broadcast television band.

19. The system of claim 11 wherein the transmitter directs a broadcast television signal.

20. The system of claim 11 further comprising an indicator which outputs information regarding the presence or three-dimensional form of the moving target.

21. The system of claim 11 wherein the radiation detected by the receiver is back scattered radiation.

* * * * *